United States Patent
Andrews et al.

(10) Patent No.: US 6,383,671 B1
(45) Date of Patent: May 7, 2002

(54) GAS HUMIDIFICATION DEVICE FOR OPERATION TESTING AND EVALUATION OF FUEL CELLS

(75) Inventors: Craig C. Andrews, College Station; Mark J. Flusche, Bryan; Donald P. Lyons, College Station, all of TX (US)

(73) Assignee: Lynntech, Inc., College Station, TX (US)

(*) Notice: Subject to any disclaimer, the term of this patent is extended or adjusted under 35 U.S.C. 154(b) by 0 days.

(21) Appl. No.: 09/392,060

(22) Filed: Sep. 8, 1999

Related U.S. Application Data

(60) Provisional application No. 60/099,465, filed on Sep. 8, 1998.

(51) Int. Cl.[7] .............................. H01M 8/04; B01F 3/04
(52) U.S. Cl. ........................ 429/24; 429/30; 261/138; 261/152; 261/156
(58) Field of Search .................... 261/138, 139, 261/141, 152, 156; 429/24, 30

(56) References Cited

U.S. PATENT DOCUMENTS

| | | | |
|---|---|---|---|
| 2,239,595 A | * 4/1941 | Cummings et al. ..... 261/141 X |
| 3,659,604 A | * 5/1972 | Melville et al. ........ 261/152 X |
| 3,801,077 A | * 4/1974 | Pearson ........................ 261/139 |
| 4,276,244 A | * 6/1981 | György et al. ........... 261/141 X |
| 4,769,297 A | 9/1988 | Reiser et al. ................. 429/17 |
| 4,826,742 A | 5/1989 | Reiser ......................... 429/3.3 |
| 5,009,967 A | * 4/1991 | Scheffler .................... 429/24 X |
| 5,139,344 A | 8/1992 | Mutter ......................... 374/28 |
| 5,242,764 A | 9/1993 | Dhar ............................ 429/30 |
| 5,262,250 A | 11/1993 | Watanabe ..................... 429/33 |
| 5,318,863 A | 6/1994 | Dhar ............................ 429/30 |
| 5,330,626 A | 7/1994 | Banerjee ................. 204/157.15 |
| 5,368,786 A | 11/1994 | Dinauer et al. .............. 261/130 |
| 5,403,675 A | 4/1995 | Ogata et al. .................. 429/33 |
| 5,512,831 A | 4/1996 | Cisar et al. ................... 324/426 |
| 5,547,551 A | 8/1996 | Bahar et al. ................. 204/296 |
| 5,635,039 A | 6/1997 | Cisar et al. ................... 204/252 |
| 5,679,482 A | 10/1997 | Ehrenberg et al. ........... 429/249 |
| 5,786,104 A | 7/1998 | Black et al. .................... 429/13 |
| 5,952,119 A | 9/1999 | Wilson .......................... 429/34 |
| 5,965,288 A | 10/1999 | Okamoto ...................... 429/26 |

OTHER PUBLICATIONS

Gang Xie, "Water Transport Behavior in Nafion 117", (Sep.) 1995, *J. Electrochem. Society*, vol. 142, No. 9, pp. 3057–3062.

D.P. Wilkinson, "Water management and stack design for solid polymer fuel cells", 1994, *Journal of Power Sources* pp. 117–127. (vol. 49, Month Unknown.

* cited by examiner

Primary Examiner—Stephen Kalafut
(74) Attorney, Agent, or Firm—Streets & Steele; Jeffrey L. Streets

(57) ABSTRACT

The present invention provides a method and apparatus for the humidification of gas streams, such as reactant gas streams for fuel cells, wherein the specific water evaporation rate, gas delivery temperature, and degree of gas humidity may be adjusted and maintained at predetermined levels. The humidification apparatus is well suited for use in testing the operation of a fuel cell under various well-controlled conditions in order to evaluate the performance of the fuel cell. The amount of water vapor being introduced into the gas stream can be varied up to the saturation point of the reactant gas stream. As the water vapor leaves the evaporation chamber, it mixes with the gas stream in a gas humidification chamber or riser. The gas riser preferably has a baffle disposed therein to attract any water that may have condensed in the gas stream and direct the condensed liquid water toward the evaporation chamber so the water may be evaporated once again. The humidified reactant gas stream is then maintained at a set point temperature which is at least above the dew point temperature of the humidified reactant gas.

28 Claims, 3 Drawing Sheets

GAS HUMIDIFICATION DEVICE FOR OPERATION TESTING AND EVALUATION OF FUEL CELLS

This application is a continuation of U.S. provisional application serial No. 60/099,465 filed on Sep. 8, 1998.

FIELD OF THE INVENTION

This invention relates to the controlled humidification of gases used by devices requiring or benefiting from external gas humidification for operation. More particularly, the invention relates to controlling the temperature and humidity of fuel and oxidant gases being provided to a fuel cell under testing conditions.

BACKGROUND OF THE INVENTION

Humidification of the fuel gas, oxidant gas or both the fuel and oxidant gases is generally required for fuel cells that use solid polymer electrolyte membranes. Proton exchange membrane (PEM) fuel cells require water to support proton conduction through the membrane. While water is a product of fuel cell reactions involving hydrogen or methanol as a fuel and oxygen or air as an oxidant, the amount of water formed is often inadequate to maintain membrane hydration.

One reason for the lack of sufficient hydration of proton exchange membranes in fuel cells is that the water is formed at the electrode where the oxidant is consumed and water is carried away by electroosmosis from the fuel consuming electrode. A significant amount of the water produced in the fuel cell reaction is removed from the fuel cell (either as water vapor or liquid water) by the flowing, heated oxidant gas stream, typically air. During operation of a PEM fuel cell, water is continually transported across the proton exchange membrane from the fuel consuming electrode to the oxidant consuming electrode due to electroosmosis.

While the product water formed may maintain sufficient humidification of proton exchange membranes at low and intermediate current density conditions, the membrane can dry out and experience increases in its internal resistance at high current density conditions. The problem of the membrane drying out has typically been addressed by adding water, usually as water vapor, to the gas stream containing the fuel, or to both gas streams (fuel and oxidizer). It also should be noted that the performance of the fuel cell decreases if the catalyst layer is flooded with liquid water either from excess water vapor being delivered to the fuel cell or the lack of a means of removing sufficient product water.

Various methods of introducing water directly in the fuel cell have been developed. U.S. Pat. No. 5,262,250 (Watanabe) teaches the use of narrow paths or wicks within the proton exchange membrane for maintaining hydration of the membrane in a fuel cell stack. However, a PEM with wicks is difficult to manufacture, requires increased manifold requirements for the cell frames, requires generation and delivery of water to the paths, presents difficulties in delivering the water uniformly across the surface of the membrane, and the amount of flow of liquid water that can be achieved through the membrane is limited and uncontrolled. In addition, the wicks rely on wetting to promote fluid flow.

Another method that is commonly used is to humidify a reactant gas inside the cell assembly, or stack, itself. This is usually done with a membrane humidifier. In this type of humidifier, a stream of liquid water is located on one side of a water permeable membrane while the reactant gas stream flows on the other side. This method uses the heat of the fuel cell itself to evaporate the water. This eliminates the need for separate heaters to humidify the reactant gas streams, but it limits the humidification of the gas streams to a dew point that is essentially the same as the cell's operating temperature. It also adds to the size of the cell stack. Since the humidifier is a structural part of the stack, it has to be built to serve as a supporting member. This can increase the weight and size of the system by a greater amount than is required for an external humidification system.

Another method for humidifying a PEM is to inject liquid water directly into either the manifold of the cell (or stack), or a reactant gas line leading to the manifold. The liquid water is injected in such a manner as to form a mist in the reactant gas line. As the reactant gas stream is heated by the cell, the water quickly evaporates due to the high surface area resulting from small droplet sizes. This type of humidifier produces a very compact humidification system. The amount of water vapor in the reactant gas stream can easily be controlled by metering the liquid water into the cell. While this can be a good system for stacks in the kilowatt range and larger, it is not an effective system for smaller fuel cell systems. The weak point of water injection methods is the difficulty encountered in forming a steady and consistent mist at low liquid water flow rates. For instance, a nominally 1 kW stack consisting of six cells, each at 0.6 V, operating at 85° C. with both the fuel and air streams humidified, requires about 10.3 grams of water per minute to humidify its air stream, assuming a 2:1 air to current stoichiometry (meaning two times the theoretical amount of air needed) at 30 psig. This amount is easily metered on a consistent basis. A smaller stack, generating 300 W at 70° C. requires only 1.50 grams of water per minute under the same feed conditions. This flow rate of water can be metered, but the higher precision required to maintain a smooth flow at the lower feed rate results in the smaller stack actually requiring a more complex humidifier. In the case of a small single cell operating at 30 W, and the same operating conditions as above, the feed rate drops to 0.150 grams of water per minute for the air stream and even less for the fuel gas stream. At these rates, maintaining a steady flow rate of water is extremely difficult.

The simplest way to humidify a reactant gas stream is to pass the gas as a stream of fine bubbles through a column of liquid water. As long as the gas has sufficient contact time with the water, the amount of water vapor in the reactant gas stream can be controlled by controlling the temperature of the liquid water. This method works well at low gas flows. To fully saturate the reactant gas with water vapor requires either small bubbles, ideally under 0.5 mm in diameter, or a tall column to allow enough contact time to ensure complete saturation. Operating the humidifier under conditions in which the reactant gas does not have sufficient contact time to become fully saturated and, as a result, is carrying a varying amount of water vapor leads to unrepeatable operation, reduced performance, and possibly damage to the fuel cell. For example, if a contact time of 0.5 seconds is required to saturate the reactant gas bubbles with water, the column will need to be at least 19 cm tall (based on Stokes law velocity of 38.2 cm/sec for a 0.5 mm bubble of air in water at 80° C.). For a flow rate of one liter of reactant gas per minute forming 0.5 mm bubbles with an average spacing of 0.5 mm, a liquid water volume of over 300 $cm^3$ is required, with a similar or greater volume for the reverse portion of the convective flow produced by the reactant gas lifting the liquid water. Additional volume is required for the disperser to form the bubbles and for a reserve of liquid water to replenish that lost to evaporation. The resulting humidifier has a volume of over one liter, and any increase in reactant gas flow will require an even larger volume.

U.S. Pat. No. 5,512,831 to Cisar teaches an internal humidification device that uses an external humidifier system and a water permeable membrane. A set of parallel water permeable tubes are used to controllably humidify a reactant gas fed to a fuel cell. The humidity is controlled by controlling the temperature at which the humidification occurs and/or by controlling the reactant gas flow rate through the system. The humidification capacity of the system is limited by the amount of liquid water that can pass through the walls of the water permeable membrane tubes. The water transfer rate is varied by adjusting the water temperature and the gas flow rate. However, the reactant gas flow rate is generally set at the rate required to operate the fuel cell under specified conditions, leaving the liquid water temperature as the only variable means of increasing or decreasing the humidification level. Due to the thermal mass of the system and the volume of water in contact with the membrane, rapid increases of the liquid water temperature are difficult to achieve, and decreasing the water temperature requires a water cooling system. The total quantity of water entrained in the reactant feed gas and the rate of water transfer are unknown and must be approximated based on other operating conditions.

U.S. Pat. No. 5,368,786 (Dinauer) teaches a humidification method using porous stainless steel tubes. The porous stainless steel tube system experiences the same limitations inherent to the membrane tube system, and may allow free reactant gas passage through the porous steel tubes if a system upset occurs and the liquid water level or water pressure within the tubes is not maintained at its proper value.

Thus, there remains a need for an improved gas humidification system and method for use with fuel cells. It would be desirable if the humidification system could form part of a stable system for testing, evaluating and utilizing fuel cells over a wide range of operating conditions and reactant gas flow rates that provides real-time, accurate control of the quantity of water delivered to the fuel cell.

SUMMARY OF THE INVENTION

The present invention provides an apparatus for controlling the temperature and humidity of a gas stream. The apparatus comprises: an evaporator chamber having a water inlet flow control valve, a heater and a port for the delivery of water vapor and the return of condensate; a gas humidifying chamber in fluid communication with the evaporator chamber port, the gas humidifying vessel having a gas inlet, elements arranged in the vessel to return condensate to the evaporator chamber port and a humidified gas outlet; and a gas transfer line in fluid communication with the humidified gas outlet, the gas transfer line having an outlet and a heater for providing the gas to the outlet at a setpoint temperature. It is preferred that the evaporator chamber port provides restricted fluid communication between the evaporator chamber and the gas humidifying chamber, such as through an orifice, in order to substantially prevent passage of the gas into the evaporator chamber during use. The apparatus may include a temperature sensor in thermal communication with the humidified gas outlet from the gas humidifying vessel and/or in thermal communication with the outlet from the gas transfer line. The elements are selected from baffles, trays, packing and combinations thereof and should be of a suitable design to direct condensate from the gas humidifying chamber back to the evaporator chamber.

The invention also provides a method for humidifying a reactant gas stream for use in a fuel cell. The method comprises: passing the reactant gas stream through a humidification chamber at a flow rate consumed by the fuel cell; providing liquid water into an evaporation chamber to produce water vapor at a flow rate proportional to the reactant gas stream flow rate; communicating the water vapor from the evaporator chamber through an orifice into the humidification chamber for humidifying the reactant gas stream; and maintaining the temperature of the humidified gas stream above a set point temperature.

BRIEF DESCRIPTION OF THE DRAWINGS

So that the above recited features and advantages of the present invention can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION OF THE INVENTION

Figure 1:
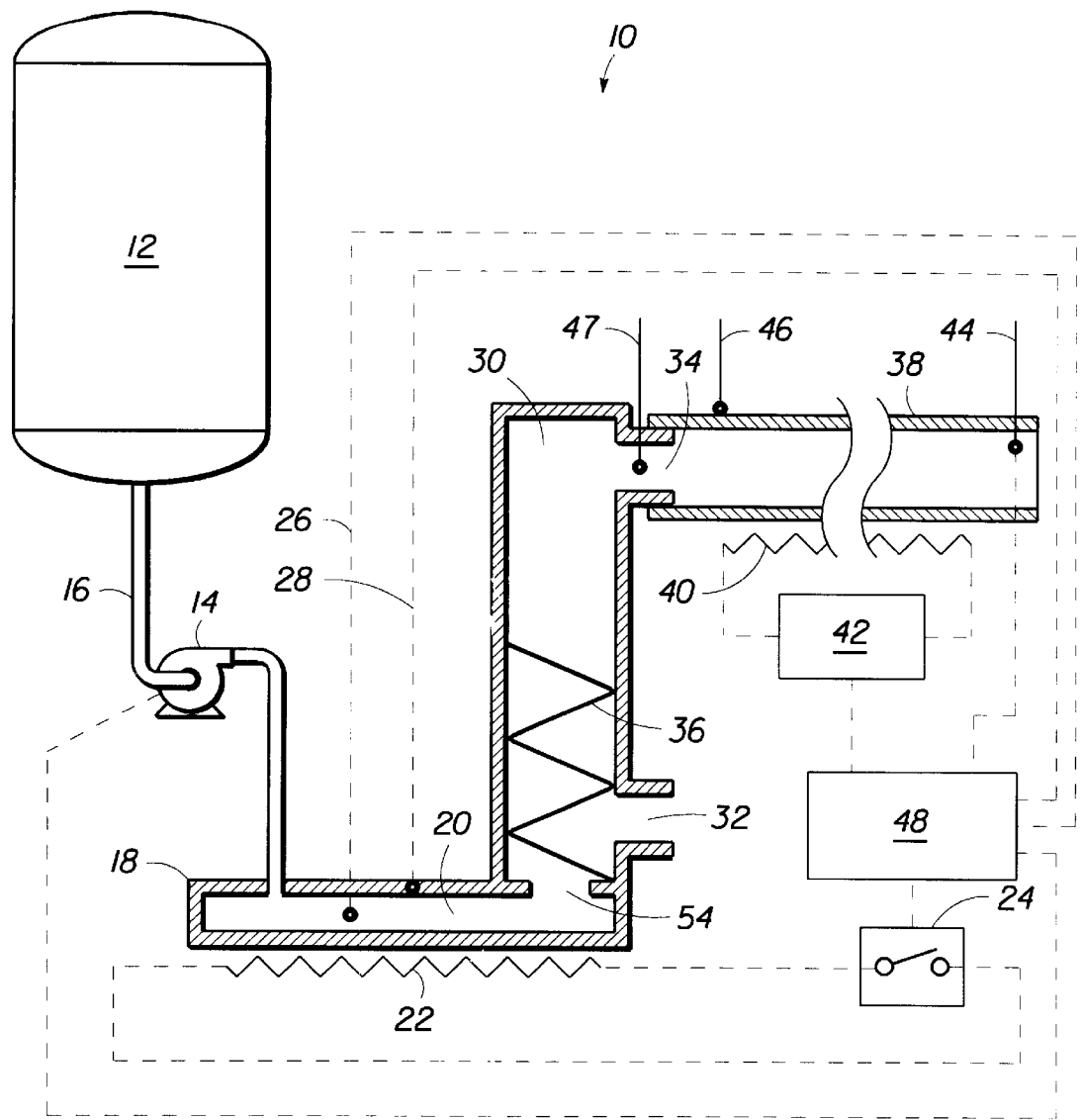
FIG. 1 is a schematic cross-sectional view of one embodiment of a gas humidification apparatus of the present invention.

The present invention relates to an apparatus used for the humidification of gas streams. More specifically, the invention relates to an apparatus where the specific water evaporation rate, gas delivery temperature, and degree of gas humidity may be adjusted and maintained at predetermined levels. While the invention is described in greatest detail below in reference to the humidification of reactant and fuel gas streams for use in fuel cells, the invention will be useful in many other applications requiring controlled humidification of a gas stream, which uses and applications are included within the scope of the present invention. Specific application of a humidification system to the testing of fuel cells is described in U.S. Pat. No. 5,512,831, which is incorporated by reference herein.

One aspect of the present invention provides a gas humidification apparatus that provides a predetermined amount of water vapor to a reactant gas stream at a controlled temperature. The amount of water vapor available for absorption by the gas stream can be varied up to the saturation point of the reactant gas stream. The humidified reactant gas stream is then maintained at a set point temperature which is at least above the dew point temperature of the humidified reactant gas. The apparatus preferably has a control unit allowing the apparatus to be operated manually, automatically, or as a sub-system in a large-scale system. The humidification apparatus is well suited for use in testing the operation of a fuel cell under various well-controlled conditions in order to evaluate the performance of the fuel cell.

The apparatus has a water evaporation chamber that may include any means of evaporating the water, including heating or ultrasonics, with heating being the most preferred for maintaining a significant vaporization rate. The evaporation chamber is preferably heated by external means, such as electric cartridge heaters, natural gas, or any other similar heat source. The size, type, and quantity of heaters are chosen such that the desired amount of water may be evaporated at the desired rate. The evaporator temperature may be maintained well above the boiling point of water in order to provide the required amount of water vapor. Specifically, the evaporator may form a plate or other element for flash vaporization of water.

After evaporation, the water vapor may optionally be further heated to the desired temperature before contacting the gas either by heat exchangers, the evaporation chamber, or a dedicated heat chamber. The heating means may be controlled by the control unit to adjust the amount of heat applied to the evaporator to meet the demand for water vapor. Preferably, the evaporator has a first temperature sensor on the outer surface of the evaporation chamber as well as a second temperature sensor on the interior of the evaporation chamber, both of which are connected to the control means.

As the water vapor leaves the evaporation chamber, it mixes with the gas stream in a gas humidification vessel or chamber, also referred to as a gas riser. The gas riser has a water vapor inlet, a gas inlet, and a humidified gas outlet. The gas riser preferably has a baffle, trays or packing disposed therein to attract any water that may have condensed in the gas stream. The baffle directs the condensed liquid water toward the evaporation chamber so the water may be evaporated once again. The preferred baffle is a perforated stainless steel sheet angling back and forth across the cross-section of the riser several times in the base of the riser. This baffle configuration has been shown to be effective in returning condensate to the evaporator, whereas packing that is too dense may enable the gas flow therethrough to actually lift much of the condensate up and out through the gas riser outlet.

When the gas has been humidified, the humidified gas travels out of the riser to a gas transfer line, where the humidified gas is transferred to a fuel cell or other apparatus. The gas transfer line preferably has at least one temperature sensor and at least one heating means that maintains the humidified gas at a predetermined temperature. The temperature sensors and heating means are connected to or in electronic communication with the control means so that they may be manually or automatically adjusted and/or maintained. The humidified gas is then delivered at the desired temperature and humidity level to the device requiring a humidified gas stream.

If the gas is at the same temperature or warmer than the water vapor, the water vapor is swept into the gas riser and the humidified gas enters the gas transfer line. If there is more water vapor than can be entrained in the gas stream, the water vapor will transfer some of its thermal energy to the gas stream resulting in a warmer gas stream and some condensation. The condensate collects on the baffles and is returned to the evaporator where it may again be evaporated and engaged with the gas stream. The baffle helps to prevent insufficient humidification of the gas stream by providing mixing and contact time between the gas and the vapor. The baffle also knocks out entrained water droplets in the gas stream. This self-regulating humidification process continues until the reactant gas stream has been sufficiently heated and is able to carry away the water vapor at the same rate that the water vapor is being generated.

As the water vapor leaves the evaporation chamber and is entrained in the gas stream it is replaced in the evaporation chamber at a rate that defines the overall quantity of water that is to be combined with the gas exiting the humidification apparatus. A metering pump can be used to transfer liquid water at a controlled rate from a water source to the evaporation chamber. This pump is preferably controlled by the controller which monitors and controls the pump transfer rate and the evaporator temperature to maintain the desired evaporation rate. However, it is possible, that the water evaporation rate selected by the user or controller cannot be achieved by the chosen gas stream, such as when the incoming reactant gas stream is already partially or fully humidified and therefore cannot take up as much water as dry gas under similar conditions. In this case, liquid water will collect within the evaporation chamber and potentially enter the gas riser causing damage to the apparatus and any attached equipment. Therefore, a means of detecting the accumulation of liquid water is positioned within the evaporation chamber. The means of detecting a flooded evaporator may include an electromechanical system, such as a float or optical water level sensor. Alternatively, the detection means may include a secondary measurement such as a temperature probe inside the evaporation chamber or attached to the exterior of the evaporator. In the latter case, the controller can determine from the measured temperature if the evaporation chamber contains water.

For example, in an evaporation chamber held at a temperature above the boiling point of water, any accumulation of liquid water in the evaporation chamber will cause the temperature in the chamber opposite the heaters to approach the boiling point of water, while the chamber temperature near the heaters will be higher than the boiling point of water. In this instance, based on temperature readings, the controller can establish that the evaporator is accumulating liquid water.

When a flooded evaporator is detected, the controller can reduce the liquid water transfer rate into the evaporator to prevent further accumulation. Likewise, in the event that the evaporator is dry or has a low water level indicating that additional water vapor may be entrained in the reactant gas stream, the controller may optionally increase the liquid water transfer rate and therefore establish the upper limit of the reactant gas water vapor holding capacity. In either case, the apparatus is able to empirically establish and operate at a point of maximum humidification, if desired, and provide the resulting data to the user.

It may also be useful if the humidification assembly is equipped to determine when the system has exceeded the normal operation mode as a humidifier and has begun to operate in an undesirable boiler mode. The boiler mode may be detected or determined by monitoring the temperature of the gas riser outlet such as by disposing a temperature sensor in thermal communication with the humidified gas outlet of the gas humidifying vessel or riser. The controller may be provided with a setpoint temperature which would indicate the boiler mode and the setpoint may be 100° C. or less, where a temperature of 100° C. indicates that the assembly is generating steam. In fact, it is anticipated that the evaporator may be operated in a manner to keep the gas riser outlet temperature in a certain operating range without the need for water level or temperature sensors in the evaporator. The operating range might be any range between ambient temperature around the assembly and 100° C.

Another aspect of the invention is a means for maintaining the temperature of the humidified gas stream exiting the gas riser at a temperature above its dew point temperature to prevent condensation. The apparatus is provided with temperature controlled gas transfer lines between the gas riser discharge or outlet and the point of entry to the fuel cell or other apparatus. The temperature controlled gas transfer lines may consist of an insulating and inert tubing wrapped with a resistive heater, and optionally further wrapped with insulation and a protective sleeve. The temperature of a humidified gas transfer line and of the humidified gas exiting the transfer line is monitored by the controller and these temperatures are used to control the power to the resistive heaters. In this manner, the humidified gas stream may be continuously held above the dew point temperature or a setpoint temperature greater than the dew point temperature until it is delivered to the fuel cell or other apparatus.

Finally, as a safety measure, the humidification apparatus is equipped with gas detectors to monitor the interior of a cabinet surrounding the apparatus, preferably including the gas riser and the fuel cell, and to some extent the ambient air outside the cabinet for dangerous or toxic gases. These gases may include any combination of toxic and combustible gases, such as carbon monoxide and hydrogen. Upon detection, the apparatus will alert the user and initiate a safety shutdown procedure.

FIG. 1 is a schematic diagram of one embodiment of the humidification apparatus 10. A water storage tank 12, metering pump 14, and transfer line 16 are in fluid communication with an evaporator 18. The evaporator 18 includes an evaporation chamber 20 which is heated by one or more heaters 22 that can be controlled by switch 24. The evaporation chamber 20 may contain a thermocouple or other device 26 to detect when liquid water is accumulating in the evaporation chamber 20. An additional thermocouple or device 28 positioned outside the evaporation chamber 20 may also be used to detect for water accumulation in the evaporator. The evaporator 18 is in fluid communication with a gas riser 30 having a gas inlet 32 and humidified gas outlet 34. The gas riser 30 includes an internal baffling structure 36 that allows condensate to travel to the edges of the gas riser 30 and be returned to the evaporation chamber 20. The baffle 36 preferably occupies the lower portion of the gas riser.

A gas transfer line 38 is heated by a heater 40 which can be controlled by switch 42. The temperature of the gas exiting the transfer line 38 is measured by temperature probe 44. An additional temperature probe 46 may be used to monitor the temperature of the transfer line 38 itself. This configuration allows the user to maintain the humidified gas stream at a desired temperature, preferably above the dew point temperature of the gas stream.

The metering pump 14, the evaporator heater 22, the transfer line heater 40, as well as the thermocouples 26, 28, 44, 46, and the switches 24, 42 are connected to or in electronic communication with a controller 48, such as a computer. The controller 48 preferably contains software for running the humidification apparatus 10 according to user defined parameters and/or preset parameters. Operating data from each component of the system can be recorded and compiled for later use in test environments as well as routine applications.

Figure 2:
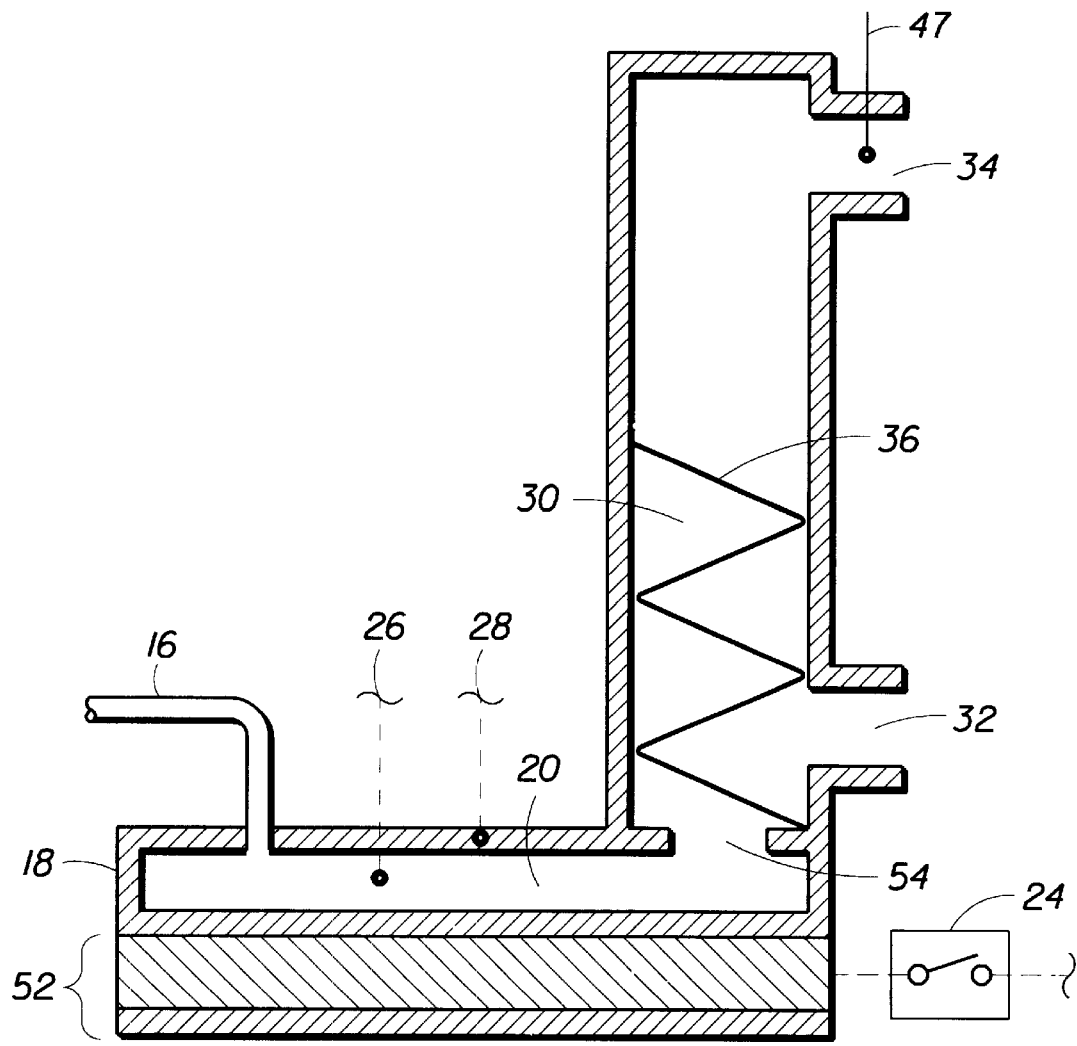
FIG. 2 is a schematic cross-sectional view of another embodiment of the present invention.

FIG. 2 is an enlarged view of the evaporator 18 and gas riser 30 shown in FIG. 1 shown with a different heating means for the evaporator 18. A set of external heaters 52 are in thermal contact with the evaporator 18 and controlled by a switch 24 so that the temperature of the evaporator may be regulated. Temperature probes 26 and 28 are placed such that they represent the temperature of the evaporation chamber 20 and the temperature of the top of the evaporator 18. These temperature probes 26, 28 are placed so that they are able to sense the temperature drop of the chamber or external portion of the evaporator when liquid water accumulates in the evaporation chamber 20.

Water vapor leaves the evaporation chamber 20 and enters the gas riser 30 through a restricted opening or evaporation chamber outlet 54. The opening 54 is restricted to prevent a substantial amount of the gas (whether it is a fuel gas, air, oxygen or any other gas) that has entered the gas riser 30 through inlet 32 from entering the evaporation chamber 20. First of all, the restricted opening minimizes contact of the oxidants, etc. with the hot metal surfaces (such as stainless steel, Inconel, etc.) which could suffer oxidation and a shortened lifetime. Secondly, it is generally good to keep fuel gases out of the evaporation chamber since fuels may contain toxic and/or corrosive gases and it is preferred to minimize the volume of these types of gases in the system. While the water being evaporated in the evaporation chamber will tend to oppose and minimize reactant gas flow into the evaporation chamber, the opening is preferably still large enough that liquid water droplets condensing in the gas riser can return to the evaporation chamber for re-evaporation. Accordingly, the present invention accomplishes these objectives with the need of any pumps, control systems, valves or the like.

Unhumidified gas enters the gas riser 30 through port 32 and is engaged with the water vapor or steam inside the riser 30. Within the gas riser 30, the gas is heated by the warm water vapor which may cause some water to condense. This condensate is removed from the gas stream by a low-restriction internal baffle 36 which serve as a surface for condensation and as a means of carrying the condensate from the center of the gas stream to the walls of the reactant gas riser 30 and back to the evaporation chamber 20 where it is re-evaporated.

Figure 3:
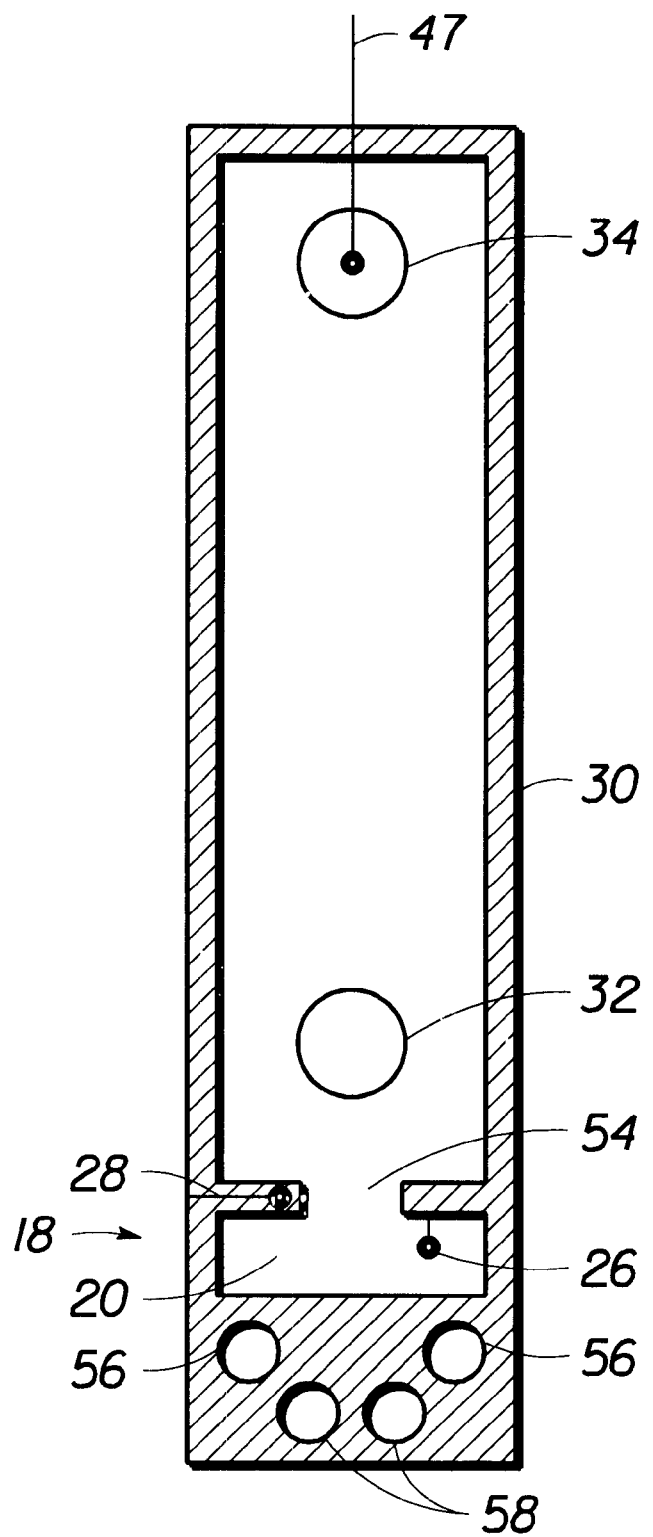
FIG. 3 is a schematic cross-sectional view of the water evaporation chamber and gas humidification chamber of FIG. 1 or 2 showing a preferred placement of the heaters and temperature measuring devices.

FIG. 3 is another cross-sectional view of the evaporator 18 and reactant gas riser 30. The evaporator 18 contains the evaporation chamber 20 and the temperature probe 26. The second temperature probe 28 is placed on the opposite side of the evaporator chamber from the heaters 56,58. Two sets of heaters are shown which may operate as a primary set 56 and a secondary set 58 to provide finer adjustment of the heat being delivered to the evaporator. The figure also shows the unhumidified reactant gas inlet port 32, and exit port 34.

EXAMPLE

An apparatus having two independent humidification subsystems or humidifiers was fabricated and tested. When testing a fuel cell, one humidifier was used for the reactant fuel gas and the other humidifier was used for the reactant oxidizer gas. The apparatus used an internal liquid water storage reservoir with a low level float switch allowing an embedded controller to monitor the water level. Optionally, the reservoir may be directly connected to a supply of water of suitable quality (deionized or distilled) and the reservoir water level maintained automatically by a mechanical float valve or the reservoir can be removed and manually filled with water. However, each humidifier had a metering pump (model RHB0CKC from FMI (Fluid Metering Incorporated) of Syosset, NY) for delivering controlled amounts of water to the evaporation chamber. The pumps were individually controlled by the embedded computer to deliver a user-defined amount of liquid water to the evaporator, specifically from zero to 25 milliliters per minute. Alternatively, stepper motors such as, FMI model STH00CKCLF, could be used to provide even tighter control of the liquid water transfer rate.

Each evaporator was fitted with multiple cartridge type heaters, each heater provided approximately 600 Watts of heat directly to the bottom portion of the evaporator. The evaporator used for humidification of the fuel gas stream was fitted with two heating cartridges while the evaporator for humidifying the oxidant gas stream was fitted with four cartridges to provide approximately twice the evaporation capacity. The cartridge heaters were placed directly beneath and in close proximity to the evaporation chambers. A temperature probe was fitted in the top of the evaporator body and was used to monitor the bulk temperature of the evaporator for heater control and to detect a flooded evaporator condition. A threaded inlet was provided at the end of the evaporator opposite the gas riser for the introduction of liquid water.

The evaporator was directly welded under a vertical gas riser having a height of 14 inches, a dry reactant gas inlet port near the bottom, and a humidified reactant gas discharge port near the top. The inside of the lower half of the gas riser was fitted with perforated stainless steel baffles that had been corrugated and pressed inside the riser such that the edges and bends of the corrugates contacted each wall. Each reactant gas riser was also fitted with a high cracking pressure (100 psi) check valve placed in the forward direction from the gas riser. The check valves operated as a pressure relief system to safely direct steam and reactant gas to a proper vent if needed.

The apparatus included thermocouple inputs and power outputs for each independently controlled, heated humidified reactant gas transfer line. The duty cycle of the power to these electrically heated transfer lines was varied to maintain the desired set point temperature.

The apparatus contained a commercially available industrial control system (such as the MicroDAC series of controller available from Grayhill of LaGrange Ill.) and individual I/O modules for control and monitoring of the apparatus. This embedded control system utilizes software that was specifically written for this application. This software provided a graphical user interface, stand alone operation, safety and performance monitoring, flooded evaporator detection and correction, and exit humidified reactant gas transfer line temperature control. The software was also designed to operate with other fuel cell test equipment so that critical parameters could be passed between the units for increased functionality and safety as well as control of the apparatus and data collection.

The invention also lends itself to other applications requiring the accurate and real-time control of the humidification of a gas stream. One example is a humidified gas stream used for dew point determination.

While the foregoing is directed to the preferred embodiment of the present invention, other and further embodiments of the invention may be devised without departing from the basic scope thereof, and the scope thereof is determined by the claims which follow.

We claim:

1. An apparatus for controlling the temperature and humidity of a gas stream comprising:
    an evaporator chamber having a controller, a heater and a port for the delivery of water vapor and the return of condensate; and
    a gas humidifying chamber in fluid communication with the evaporator chamber port, the gas humidifying chamber having a gas inlet, elements arranged in the gas humidifying chamber to return condensate to the evaporator chamber port and a humidified gas outlet.

2. The apparatus of claim 1, wherein the evaporator chamber heater is a flash plate.

3. The apparatus of claim 1, wherein the evaporator chamber port provides restricted fluid communication between the evaporator chamber and the gas humidifying chamber.

4. The apparatus of claim 1, wherein the evaporator chamber port provides a sufficiently small opening to substantially prevent passage of the gas into the evaporator chamber during use.

5. The apparatus of claim 1, wherein the evaporator chamber port comprises an orifice.

6. The apparatus of claim 1, further comprising a first temperature sensor in thermal communication with the humidified gas outlet from the gas humidifying chamber.

7. The apparatus of claim 1, further comprising:
    a gas transfer line in fluid communication with the humidified gas outlet, the gas transfer line having an outlet for transferring the humidified gas to a fuel cell and a heater for providing the gas to the outlet at a setpoint temperature.

8. The apparatus of claim 7, further comprising a temperature sensor in thermal communication with the outlet from the gas transfer line.

9. The apparatus of claim 1, wherein the elements are selected from baffles, trays, packing and combinations thereof.

10. The apparatus of claim 9, wherein the elements direct condensate back to the evaporator chamber.

11. The apparatus of claim 1, wherein the controller controls a device selected from a control valve and a metering pump.

12. A method for humidifying a reactant gas stream for use in a fuel cell comprising:
    passing the reactant gas stream through a humidification chamber;
    providing liquid water into an evaporator chamber at a mass flow rate to produce water vapor at a mass flow rate in relation to the liquid water mass flow rate; and
    communicating the water vapor from the evaporator chamber into the humidification chamber for humidifying the reactant gas stream.

13. The method of claim 12, further comprising monitoring the temperature of the water vapor; and maintaining the temperature of the water vapor at a set-point temperature.

14. The method of claim 12, further comprising monitoring the performance of the fuel cell while changing the flow rate of the water vapor in proportion to the flow rate of the reactant gas stream.

15. The method of claim 12, further comprising monitoring the performance of the fuel cell while changing the setpoint temperature of the humidified reactant gas stream.

16. The method of claim 12, further comprising monitoring the evaporation rate of the water in the evaporation chamber; and adjusting the amount of water provided to the evaporation chamber based on the evaporation rate of water in the evaporation chamber.

17. The method of claim 12, wherein the reactant gas stream is passed through the humidification chamber at a flow rate required to operate the fuel cell.

18. The method of claim 12, wherein the water vapor is communicated from the evaporator chamber into the humidification chamber through an orifice.

19. The method of claim 12, wherein the mass flow rate of the water vapor is in relation to the flow rate of the reactant gas stream.

20. The method of claim 12, further comprising monitoring the performance of the fuel cell while changing the flow rate of the water vapor.

21. The method of claim 12, further comprising transferring heat between the reactant gas stream and the water vapor.

22. The method of claim 12, further comprising:
monitoring humidity of the humidified reactant gas stream; and
changing the flow rate of liquid water to maintain a humidity setpoint.

23. The method of claim 12, further comprising:
superheating the water vapor.

24. The method of claim 12, further comprising:
condensing water vapor from the reactant gas stream in the humidification chamber.

25. The method of claim 12, further comprising: providing a gas transfer line from the humidification chamber to an outlet for communication with the fuel cell; and maintaining the gas transfer line temperature in relation to the outlet gas temperature.

26. The method of claim 12, further comprising: providing a gas transfer line from the humidification chamber to an outlet for communication with the fuel cell; and maintaining the gas transfer line temperature in relation to the outlet gas dewpoint temperature.

27. The method of claim 12, further comprising: providing a gas transfer line from the humidification chamber to an outlet for communication with the fuel cell; and heating the gas transfer line to prevent condensation of water vapor.

28. The method of claim 12, further comprising monitoring the temperature of the humidified gas stream; and maintaining the temperature of humidified gas stream at a set-point temperature.

* * * * *